United States Patent [19]

Giacosa

[11] 4,161,894

[45] Jul. 24, 1979

[54] AUTOMATIC TRANSMISSION DEVICE, WITH BELT TRANSMISSION RATIO VARIATOR, PARTICULARLY FOR MOTOR VEHICLES

[75] Inventor: Dante Giacosa, Turin, Italy

[73] Assignee: Sira Societa' Industriale Ricerche Automotoristiche, Turin, Italy

[21] Appl. No.: 853,593

[22] Filed: Nov. 21, 1977

[30] Foreign Application Priority Data

Nov. 24, 1976 [IT] Italy .............................. 69792 A/76

[51] Int. Cl.² ...................... F16H 55/52; B60K 41/12
[52] U.S. Cl. .............................. 74/863; 74/230.17 F
[58] Field of Search ............. 74/230.17 F, 863, 864, 74/867, 868, 869

[56] References Cited

U.S. PATENT DOCUMENTS

| 2,575,522 | 11/1951 | McFarland | 74/864 |
| 3,001,415 | 9/1961 | Smirl | 74/864 |
| 3,017,785 | 1/1962 | Van Der Brugghen et al. | 74/863 |
| 3,546,973 | 12/1970 | Ohie et al. | 74/864 |
| 3,557,640 | 1/1971 | Hendriks et al. | 74/230.17 F |
| 3,561,296 | 2/1971 | Iijima | 74/864 |
| 3,563,115 | 2/1971 | Iijima et al. | 74/864 |
| 3,842,693 | 10/1974 | Oberpichler | 74/868 |
| 3,893,344 | 7/1975 | Dantlgraber et al. | 74/230.17 F |
| 3,918,312 | 11/1975 | Espenchied et al. | 74/230.17 F |
| 3,941,016 | 3/1976 | Will | 74/868 |

FOREIGN PATENT DOCUMENTS

| 1119621 | 2/1956 | Fed. Rep. of Germany | 74/230.17 F |
| 2703487 | 8/1977 | Fed. Rep. of Germany | 74/230.17 F |
| 1304112 | 8/1962 | France | 74/230.17 F |
| 499690 | 1/1939 | United Kingdom | 74/863 |
| 989227 | 4/1965 | United Kingdom | 74/863 |

*Primary Examiner*—Samuel Scott
*Assistant Examiner*—William R. Henderson
*Attorney, Agent, or Firm*—Sughrue, Rothwell, Mion, Zinn and Macpeak

[57] ABSTRACT

An automatic transmission device for vehicles having an automatic transmission ratio variator formed by two expandable pulleys interconnected by a trapezoidal belt, hydraulic fluid under pressure being fed to the pulleys to control the distance between two half-pulleys forming each pulley under control of a valve subjected on two opposed faces to the vacuum in the engine induction manifold and to a fluid pressure dependent upon the speed of the driving pulley respectively. The face of the control valve which is subjected to the said fluid pressure is divided in effect into two separate faces one of which is connected directly to a pressure transducer response to the engine speed and the other of which is connected to the said transducer through a selector valve which may be a solenoid operated in dependence upon the accelerator pedal position.

8 Claims, 4 Drawing Figures

AUTOMATIC TRANSMISSION DEVICE, WITH BELT TRANSMISSION RATIO VARIATOR, PARTICULARLY FOR MOTOR VEHICLES

The present invention relates to a transmission device interposed between the engine and the drive wheels of a motor vehicle, of the type having an automatic transmission ratio variator for effecting variation of the transmission ratio, that is, the ratio of the vehicle speed to the engine speed.

More specifically, the invention relates to a motor vehicle transmission device including an automatic transmission ratio variator having two expandable pulleys, each formed by two half-pulleys, interconnected by a transmission belt of trapezoidal cross section, a pump which feeds hydraulic fluid under pressure through a delivery pipe to the pulleys so as to cause a variation of the distance between the two half-pulleys forming each of the two pulleys, a control valve interposed between the pump and the driving pulley and having a displaceable member subjected on two opposed faces to the vacuum in the engine induction manifold and to a fluid pressure which varies in dependence upon the rotational speed of the driving pulley, and a modulation valve which modulates the pressure of the hydraulic fluid delivered by the pump, subjected on one face to the said fluid pressure and on an opposite face to a pressure proportional to the separation of the half-pulleys of one of the pulleys.

In motor vehicles, trapezoidal belt transmission ratio variators are used for effecting a range of transmission ratio variation comparable to that of a motor car four-speed gearbox, under the control of an hydraulic circuit as described above, of conventional type, giving the vehicle running characteristics which afford a compromise between performance, fuel consumption and comfort.

Because the specific fuel consumption of an explosion engine is lowest when the engine is running at maximum torque and furthermore gradually diminishes as the engine throttle is opened, it is desirable to operate the engine at maximum torque with the throttle opening as wide as possible. For this purpose, it is necessary to use ratio variators with a wide total transmission ratio variation, of the order of that of a gearbox with overdrive and beyond.

In variators of this type, a hydraulic control circuit as described above is not sufficient, because the fuel consumption is improved to the detriment of performance. It is therefore desirable to provide a circuit capable of programming the ratio variator for "economic running" when it is desired to operate with maximum economy, and for "normal running" when it is desired to operate with maximum performance in terms of acceleration and response.

Therefore, the object of the present invention is to provide a transmission device of the type described above which has a hydraulic control circuit permitting operation of the automatic variator under two types of running condition, that is, "economic" running with optimum fuel consumption, in which the variator starts to increase the ratio at a low engine rotational speed and the expandable pulleys can expand to their maximum extent, allowing the transmission ratio to reach the maximum value, and "normal" running with maximum performance, in which the variator starts to increase the ratio at a higher engine rotational speed and the transmission ratio cannot exceed the value at which the motor vehicle reaches maximum speed at the maximum power rating of the engine.

The present invention achieves this object by providing a transmission device of the type described above which is characterised in that the face of the displaceable member of the control valve which is subjected to the fluid pressure which varies with the speed of rotation of the driving pulley is divided in effect into two separate faces, a first face being directly connected to a pipe which delivers a pressure signal from a pressure transducer responsive to the rotational speed of the engine and a second face being connected to the said pipe through a selector valve.

The changeover of the variator from one running condition to the other can be effected automatically in dependence on the position of an engine power control element, normally an accelerator pedal, mechanically or electrically connected to the selector valve.

In a preferred embodiment of the invention the delivery pipe of the pump is connected, between the control valve and the driving pulley, to the selector valve, which in turn is connected to a limiting valve controlled by means of a displacement transducer in dependence upon the position of the movable half-pulley of the driving pulley. This makes it possible to limit the displacement of the movable half-pulleys during "normal" running so as not to exceed that transmission ratio value which allows the motor vehicle to reach its maximum speed at the maximum power rating of the engine.

The invention will be further described, by way of non-limiting example, with reference to the accompanying drawings, in which.

The same reference numerals are used throughout the drawings to designate the same or corresponding component parts.

For a better understanding of the invention reference will first be made to a normal trapezoidal belt ratio variator of the prior art, constructed for a total ratio variation comparable to that of a four-speed automobile gearbox. Such a variator has operating characteristics as shown by a continuous line in FIG. 1, which shows on the abscissa the rotational speed n of the engine in revolutions per minute and on the ordinate the speed V of the vehicle in kilometers per hour. If the carburettor throttle of the engine is slightly open, the variator will vary the transmission ratio along the line O A B C D E F, whilst when the throttle is fully open the variator will vary the ratio along the line O G H I E F. In the first case, the variator will start to increase the transmission ratio at an engine speed of 2200 r.p.m., while in the second case, the variator will increase the transmission ratio as from an engine speed of 4400 r.p.m.

If one considers a ratio variator with a total range of transmission ratio variation comparable to that of a five speed gearbox, or a gearbox having even more speeds, then assuming that at a relatively low engine speed (e.g.

Figure 1:
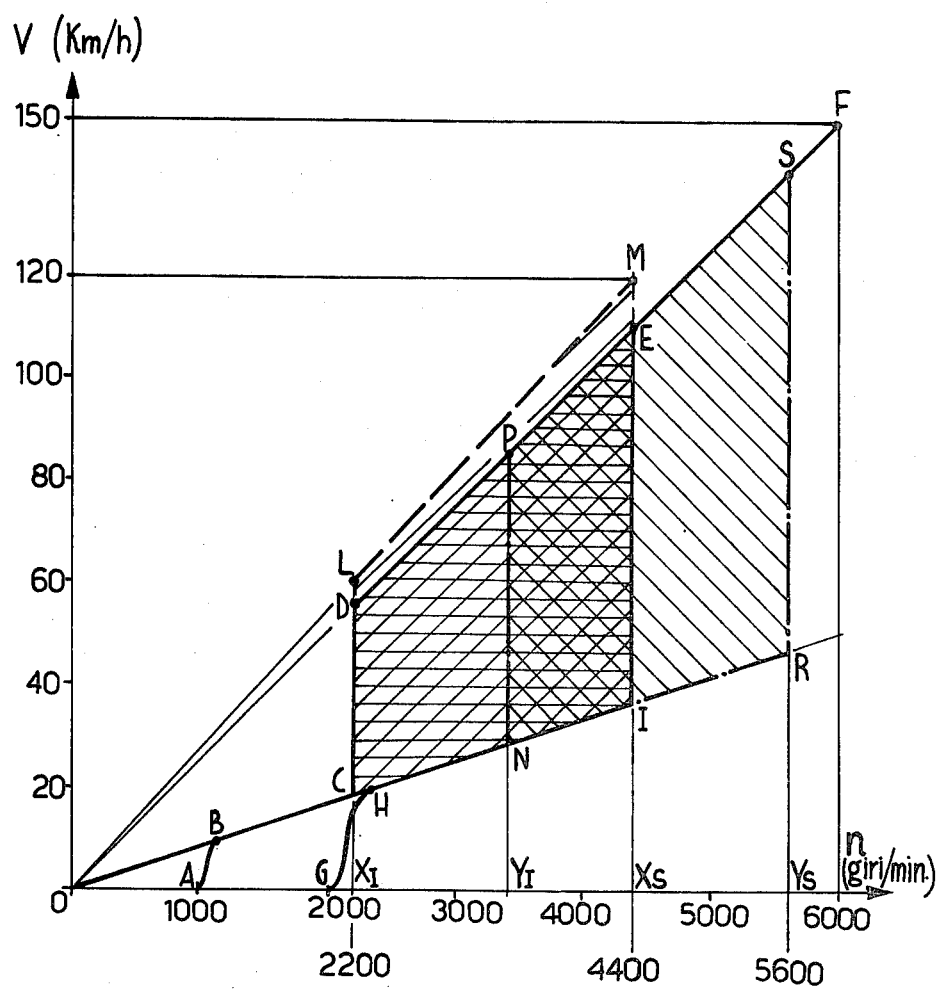
FIG. 1 is a graphical diagram comparing the operation of a conventional ratio variator with a ratio variator according to the invention.

4400 r.p.m.) the engine delivers maximum power sufficient to drive the vehicle at a speed of 120 k.p.h. the resulting operating diagram for this variator would be that shown by a dash line in FIG. 1.

The variator will function along the line O A B C L M when the throttle is only slightly open, whilst when the throttle is fully opened the variator will function along the line O C H I M. In this way, the range of use of the variator has been increased, obtaining the economic advantage referred to above: the engine will never be able to exceed the rotational speed of 4400 r.p.m. and will operate at very high percentage power rating. Since, however, it is not possible to use engine speeds above 4400 r.p.m. it is not possible to drive the vehicle at maximum speed.

It is clearly desirable to be able to obtain from the ratio variator a "normal" running condition, which permits maximum acceleration and maximum vehicle speed, in accordance with the operating diagram shown by dashes and dots in FIG. 1: in fact, by varying the control parameters of the control valve of the variator, it is possible to increase the engine speeds at which the variator intervenes, so as to cause it to operate in accordance with the line O A B N P S with small throttle openings or in accordance with the line O G H R S F with the throttle fully opened, obtaining in the latter case the maximum possible acceleration with the engine running at 5600 r.p.m.

Figure 2:
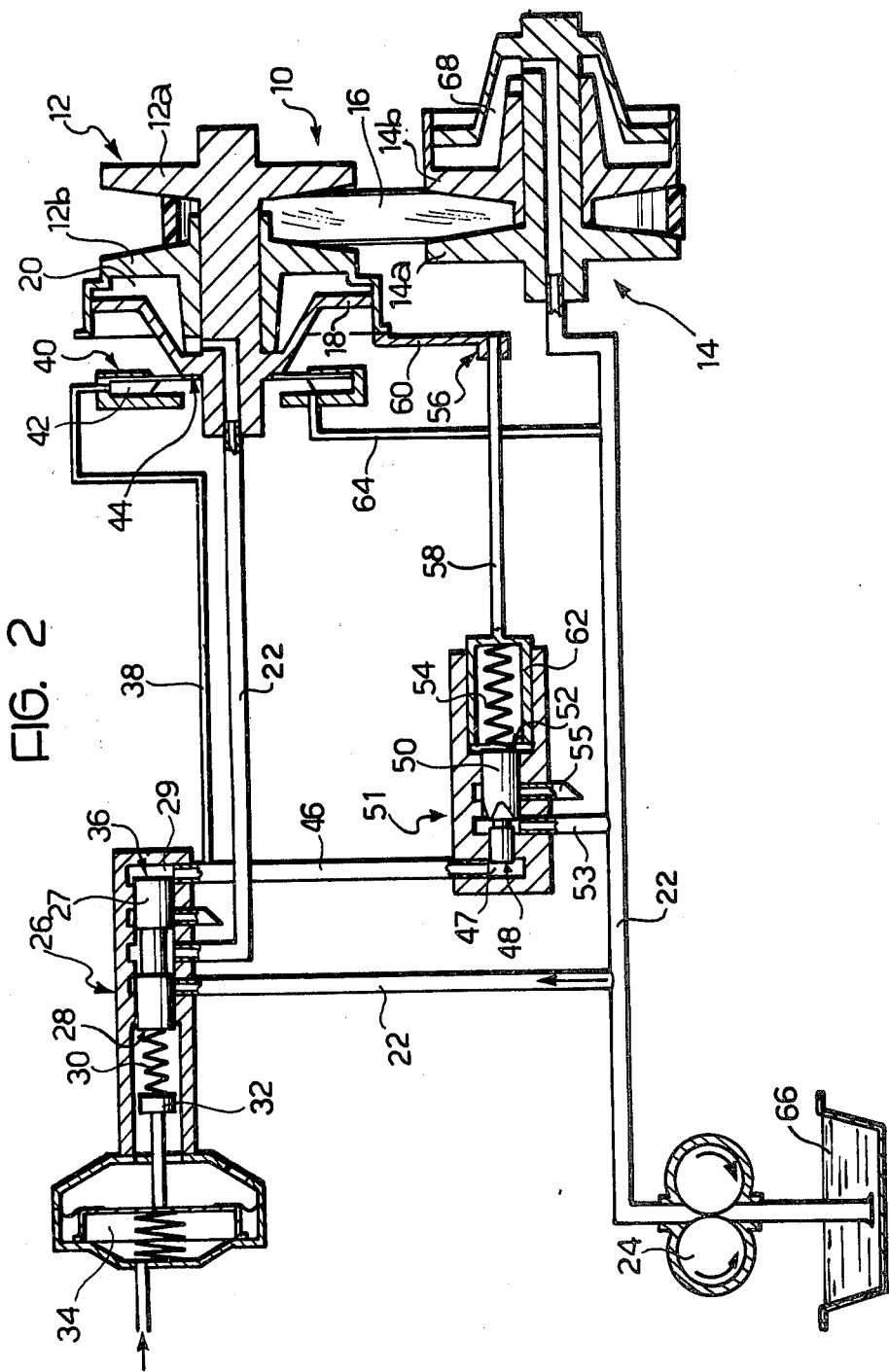
FIG. 2 is a schematic diagram of a conventional prior art hydraulic control circuit of a ratio variator having two expandable pulleys.

FIG. 2 shows diagrammatically a conventional hydraulic control circuit of a transmission variator 10 with two expandable pulleys 12 and 14 interconnected by a belt 16 of trapezoidal cross section. The pulley 12 is the driving pulley, connected to the crankshaft of the engine (not shown) whilst the pulley 14 is the driven one, connected to the drive wheels of the vehicle. The pulley 12 is formed by two half-pulleys 12a and 12b, the half pulley 12b being axially displaceable relative to the half-pulley 12a. Similarly, the driven pulley 14 is formed by half-pulleys 14a and 14b of which the half-pulley 14b is axially displaceable relative to the half-pulley 14a.

The half-pulley 12a has a flange 18 which forms with the displaceable half-pulley 12b a pressure chamber 20. This pressure chamber 20 is connected through a pressure pipe 22 to a pump 24 which feeds oil under pressure from a tank 66. The half-pulley 14a has a flange which with the displaceable half-pulley 14b forms a pressure chamber 68 connected through the pressure pipe 22 to the pump 24.

A control valve 26 is inserted in the pipe 22, between the pump 24 and the driving pulley 12. The control valve 26 has a movable valve spool 27 on the left hand face 28 (as viewed in FIG. 2) of which a piston 32 acts through an interposed helical spring 30. The piston 32 is connected to the movable diaphragm element of a vacuum transducer 34 to which the pressure in the induction manifold of the engine is applied through a pipe 34a. A chamber 29 is defined in the housing of the valve 26 at the right hand end of the valve spool 27 opposite the transducer 34 and is connected through a pressure pipe 38 to a transducer 40 capable of supplying a pressure signal dependent upon the rotational speed of the driving pulley 12.

The transducer 40 comprises a dynamic pick-up responsive to the fluid pressure at the periphery of an annular chamber 42, this pressure being the dynamic pressure of oil contained in the chamber 42 and set in rotation by an impeller 44 fixed to the half-pulley 12a.

This dynamic pressure is a function of the speed of rotation of the driving pulley 12. Oil under pressure is fed to the chamber 42 of the transducer 40 through a pipe 64 connected to the pump 24.

The chamber 29 of the control valve 26 is connected through a pipe 46 to a chamber 47 adjacent the left hand face 48 of a movable element 50 of a modulating valve 51. The valve 51 controls the flow of the fluid delivered by the pump 24 between an inlet 53 and an exhaust outlet 55 from which oil is returned to the tank 66. Against the right-hand face 52 of the valve element 50, there acts, through an interposed elastic element or helical spring 54, a transducer 56 responsive to the displacement of the movable half-pulley 12b of the driving pulley 12. The transducer 56 comprises in this example a rod 58 which is coaxial with the movable modulating valve element 50 and fixed to a flange 60 attached to the movable half-pulley 12b. The rod 58 is fixed to a displaceable cup-shaped sleeve 62 which acts on the valve element 50 through the spring 54.

The conventional variator device illustrated in FIG. 2 operates as follows. The pump 24 delivers oil under pressure from the tank 66 through the pressure pipe 22 which is connected to the pressure chamber 68 of the driven pulley 14 and, through the control valve 26, to the pressure chamber 20 of the driving pulley 12.

The modulating valve 51 regulates this pressure in dependence upon two parameters:

(a) a pressure signal representative of the speed of rotation of the driving pulley 12, transmitted from the transducer 40 through the pipe 38 and the pipe 46 to the left face 48 of the movable valve element 50, and (b) the position of the displaceable half-pulley 12b, transmitted to the valve element 50 by the transducer 56, the rod 58 and the spring 54.

The control valve 26 controls the supply of oil under pressure to the chamber 20 of the driving pulley 12 in dependence upon two parameters:

(a) the vacuum in the induction manifold of the engine, transmitted to the left face 28 of the valve spool 27 through the spring 30, and (b) the rotational speed of the driving pulley 12, transmitted as a pressure signal from the transducer 40 through the pipe 38 to the right face 36 of the valve spool 27.

An increase in the transmission ratio of the variator 10 occurs as a result of displacement of the half-pulley 12b of the driving pulley 12 to the right as viewed in FIG. 2, accompanied by a corresponding displacement towards the left of the half-pulley 14b of the driven pulley 14. This causes the trapezoidal belt 16 to adopt an arc of contact with each pulley 12, 14 of increasing radius.

With vehicle stationary and the engine idling the control valve spool 27 will be displaced fully to the right by the spring 30, which exerts a minimum load since the vacuum transducer 34 will be fully contracted by the high vacuum acting in the induction manifold. No pressure will be applied to the right-hand face 36 of the control valve 26 because the driving pulley 12, and therefore the impeller 44, is stationary, being coupled to the engine through a centrifugal clutch (not shown).

Upon depressing the accelerator pedal and thereby opening the engine throttle the speed of the engine is increased; the driving pulley 12 will be set in rotation by the centrifugal clutch, and the transducer 40 will supply to the right-hand face 36 of the control valve 26 a gradually increasing pressure. At a rotational threshold speed $X_1$ (FIG. 1), the force acting on the right-hand face 36 of the control valve spool 27 will be greater than that applied by the spring 30 to the left-hand face 28, and the valve spool 27 will be displaced towards the left, connecting the pressure pipe 22 to the pressure chamber 20 and causing the half-pulley 12b to be displaced towards the right to increase the transmission ratio of the variator 10.

The lower threshold speed $X_1$ depends on the position of the accelerator pedal and on the load of the engine, which determines the magnitude of the vacuum in the transducer 34. With a fully opened throttle the vacuum will be a minimum, and the variator 10 will start to increase the transmission ratio at a high threshold speed $X_1$; when the throttle is partially open the variator 10 will respond at lower threshold speeds $X_1$. The other parameters being equal, the intervention threshold $X_1$ of the variator depends on the area of the right-hand face 36 of the control valve spool 27: the smaller the area of this right-hand face 36, the greater will be the pressure required to overcome the force of the spring 30, and therefore the higher the speed of rotation of the driving pulley 12 will have to be to cause the displacement of the valve spool 27.

The present invention affords in effect a means for varying the effective area of the right-hand face of the control valve spool 27.

Figure 3:
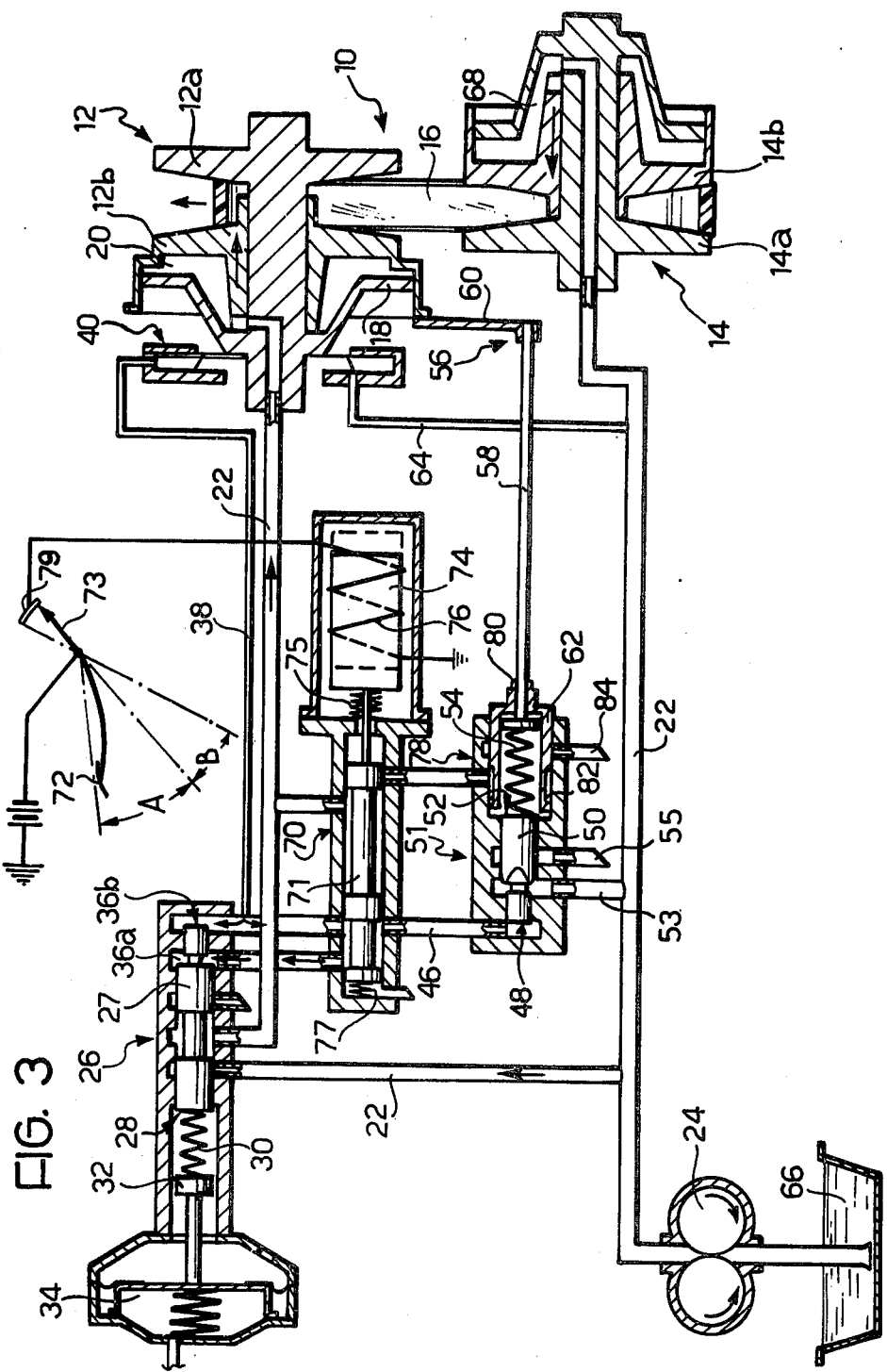
FIG. 3 is a diagram of the hydraulic control circuit of a variator according to the invention, illustrating the "economic" running condition.
Figure 4:
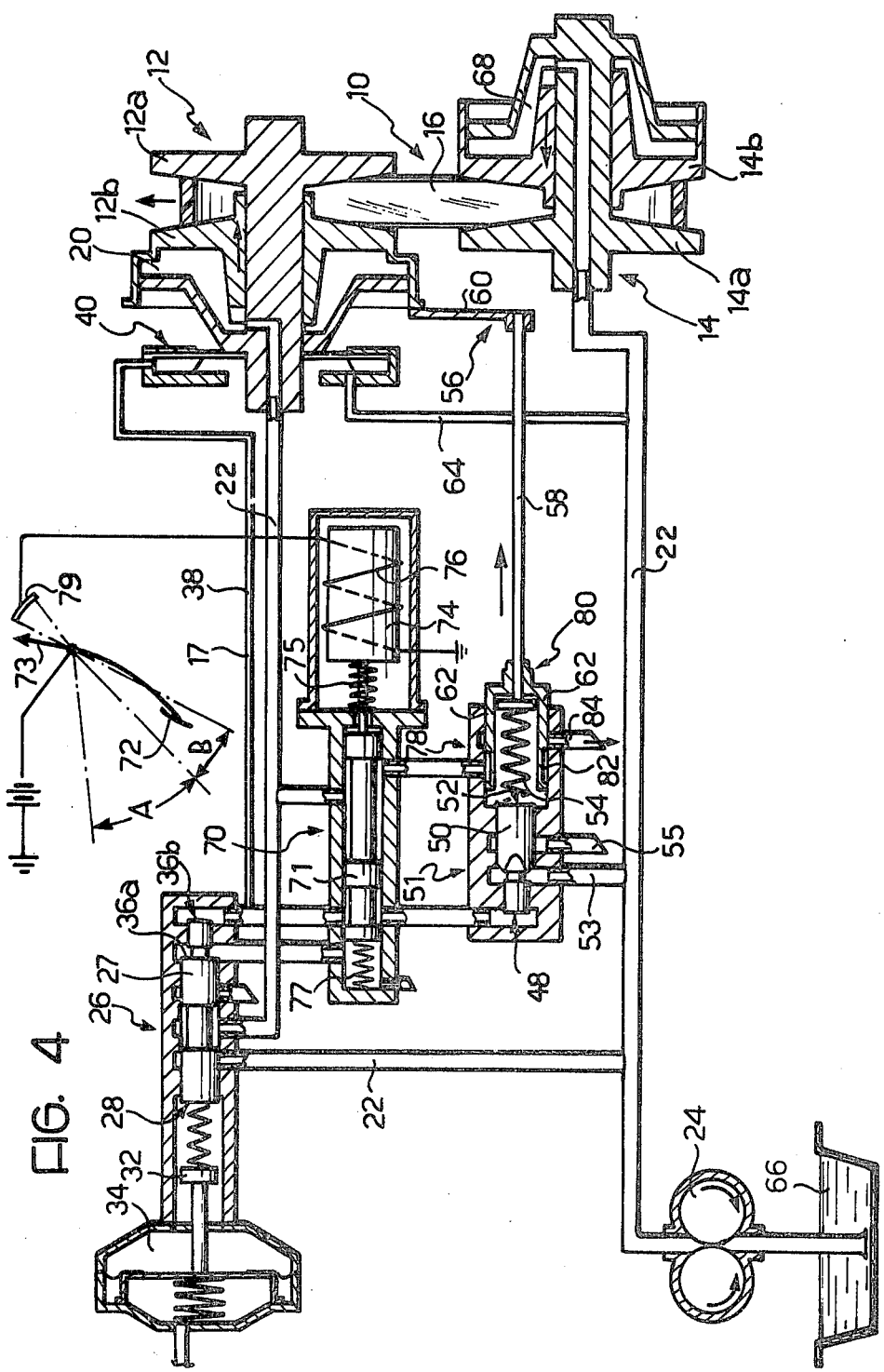
FIG. 4 shows the circuit of FIG. 3 in its "normal" running condition.

FIGS. 3 and 4 illustrate an embodiment of the invention in which the right-hand face 36 of the spool 27 of the control valve 26 is constituted in effect by two separate and concentric faces 36a and 36b. A first face 36b is subjected through the pressure pipe 38 to the pressure generated by the transducer 40, whilst a second face 36a is connected to the pipe 38 through a selector valve 70.

The selector valve 70 has a movable element 71 which is electrically or hydraulically controlled by the accelerator pedal 72 of the motor vehicle. In the example illustrated the movable element 71 of the valve 70 is connected to a movable armature 74 of a solenoid having a coil 76. The accelerator pedal 72 carries a wiping contact 73 which, in a first part of the arc of travel of the accelerator pedal 72, indicated by "A" in FIGS. 3 and 4, cooperates with a fixed conductive sector 79 to complete an energizing circuit of the solenoid coil 76. When energized the coil 76 displaces the valve element 71 towards the left as illustrated in FIG. 3. In a second part of the arc of travel of the accelerator pedal 72, indicated by "B," the wiping contact 73 is disengaged from the conductive sector 79 and the valve element 71 is displaced towards the right by the action of return springs 75 and 77, as illustrated in FIG. 4.

The pressure pipe 22 is connected, between the control valve 26 and the chamber 20 of the driving pulley 12, to an intermediate chamber of the selector valve 70, which in turn is connected to a pressure limiting valve 78. The limiting valve 78 is formed in this embodiment by the cup-shaped sleeve 62 which is coaxially displaceable with respect to the modulating valve element 50. The closed end of the sleeve 62 is connected by an adjustment screw device 80 to the rod 58 of the displacement transducer 56. The sleeve 62 has an external circumferential groove 82 by means of which the aforesaid section of the pressure pipe 22 is put into communication with an exhaust outlet 84 when the sleeve 62 is displaced to the right.

In the condition illustrated in FIG. 3 with the solenoid coil 76 energized the selector valve 70 allows the pressure signal to be delivered from the transducer 40 to both the faces 36a and 36b of the control valve spool 27 and intercepts the passage of the oil from the pressure pipe 22 to the limiting valve 78.

In the condition illustrated in FIG. 4, with the solenoid coil 76 de-energized, the selector valve 70 intercepts the delivery of the pressure signal from the transducer 40 to the second face 36a of the control valve spool 27 and places the pressure pipe 22 in communication with the annular groove 82 of the limiting valve 78. The groove 82 in turn connects the pressure pipe 22 to the exhaust outlet 84 when the sleeve 62 is moved to the right, by means of the displacement transducer 56, into a position corresponding to a predetermined displacement of the half-pulley 12b towards the half-pulley 12a of the driving pulley 12.

The accelerator pedal 72 can operate, as already stated, as a selector of the operating condition of the variator 10: in a first stage of its travel, represented by the arc A, the variator 10 is in the "economic" running condition shown in FIG. 3; in a second stage of the travel of the accelerator pedal 72, represented by the arc B, the solenoid armature 74 is displaced to the position shown in broken outline in FIG. 3, displacing the selector valve 70 to the right and thereby reducing the effective surface area of the spool 27 of the control valve 26 which is acted upon by the fluid under pressure supplied by the transducer 40, causing the variator 10 to adopt the "normal" running condition.

If a very wide range of variation of the transmission ratio of the variator 10 is desired, for example by providing an extra high transmission ratio corresponding to an "overdrive," for the purpose of fully exploiting the full power that the engine can deliver at about two thirds of its maximum speed, the pressure signal provided by the transducer 40 is applied to both faces 36a and 36b thus obtaining a lower threshold of intervention $X_1$ at a low number of revolutions of the engine and a higher threshold of functioning at about two thirds of the maximum speed of the engine, beyond which the variator 10 will always be operating at maximum transmission ratio. The engine cannot, therefore reach a speed corresponding to maximum power, and the vehicle will not be able, in principle, to reach its maximum speed. This mode of operation reduces the fuel consumption but considerably lessens the performance of the vehicle.

To achieve maximum performance the upper threshold of operation of the variator 10 is increased to an engine speed $Y_S$ slightly below the maximum power rating. This is achieved with the solenoid coil 76 de-energized so that the pressure signal provided by the transducer 40 is applied solely to the first face 36b (FIG. 4). As stated earlier, the lower threshold of intervention of the variator will then be increased to a speed $Y_1$ greater than $X_1$, permitting greater acceleration of the vehicle.

FIG. 3 therefore represents the condition of the hydraulic control circuit of the variator 10 for optimum fuel consumption, with maximum increase of the transmission ratio, corresponding to the first arc of travel A of the accelerator pedal 72. This 'economic' running condition is identical to that already described: the pressure supplied by the transducer 40 is applied to both faces 36a and 36b of the control valve 26.

Further depression of the accelerator pedal 72 in the arc of travel B will result in de-energization of the coil 76, and the movable element 71 of the selection valve 70 will be snap-displaced towards the right by the spring 77, the circuit condition then being as illustrated in FIG. 4. The pressure signal supplied by the transducer 40 then acts only on the first face 36b and the lower threshold of intervention of the variator 10 is shifted from the speed $X_1$ to a higher engine speed $Y_1$ (FIG. 1). Likewise the speed above which the variator 10 is always in a high transmission ratio is displaced from the speed $X_S$ to a higher speed $Y_S$ closer to the maximum speed of the engine.

At this point it is necessary to prevent the variator 10 from reaching the maximum transmission ratio: the limiting valve 78 then serves to limit the travel of the half-pulley 12b of the driving pulley 12 such that the ratio of the rotational speed of the engine to that of the vehicle wheels is that which permits the maximum speed of the car at the maximum engine power. In fact, at high speeds the pressure on the first face 36b keeps the control valve spool 27 always towards the left so that the pressure pipe 22 supplies oil under pressure to the chamber 20 of the driving pulley 12. The pipe 22 also communicates through the right hand part of the selector valve 70 with the groove 82 of the limiting valve 78 which, in a certain position of the half-pulley 12b, discharges the excess fluid through the exhaust outlet 84 and does not permit further movement of the half-pulley 12b to the right. With this arrangement the ratio of the engine speed to the speed of the vehicle wheels is fixed at an optimum value, intermediate the minimum and maximum overdrive ratio, a ratio which is adjustable by means of the adjustment screw device 80.

The advantages of the variator according to the invention and of its control circuit are clearly evident in FIG. 1 where the double-hatched area C D E I represents the range of operation of a normal variator according to the prior art, whilst a variator with a control circuit according to the present invention has a range of operation which comprises, in addition to the double-hatched areas, the single hatched area I E S R and the upper dashed area D L M E: the upper dashed area D L M E represents a decrease in fuel consumption, and the hatched area I E S R on the right represents an improvement in the performance of the vehicle.

I claim:

1. A transmission device for interposition between the engine and the drive wheels of a motor vehicle, including an automatic transmission ratio variator comprising a driving pulley and a driven pulley, each of which is expandable and formed by two half-pulleys, a transmission belt of trapezoidal cross section interconnecting the two pulleys, a pump which feeds hydraulic fluid under pressure through a delivery pipe to the pulleys so as to cause a variation of the distance between the two half-pulleys forming each of the two pulleys, a control valve interposed between the pump and the driving pulley and having a displaceable member with two opposite faces, means applying to one said face the vacuum in the engine induction manifold, means applying to the opposite said face a fluid pressure which varies in dependence upon the rotational speed of the driving pulley, a modulation valve having two opposite faces which modulates the pressure of the hydraulic fluid delivered by the pump, means applying to one face of the modulation valve the said fluid pressure and means applying to the opposite face of the modulation valve a pressure proportional to the separation of the half-pulleys of one of the said pulleys, wherein the improvement consists in:

the division of the face of the displaceable member of the control valve which is subjected to the said fluid pressure effectively into two separate faces, a pressure transducer responsive to the rotational speed of the engine to provide a pressure signal which is applied directly to a first of the said faces of the control valve, and a selector valve controlling the application of said pressure signal to a second of said control valve faces.

2. A device as in claim 1, wherein the two separate faces are coaxial and axially spaced apart on the displaceable member of the control valve.

3. A device as in claim 1, including an accelerator pedal, means operatively connecting said accelerator pedal to the selector valve such that in a first part of the travel of the pedal the selector valve applies the pressure signal from the rotational speed transducer to both the first and second faces of the displaceable member of the control valve whilst in a second part of the travel of the accelerator pedal the selector valve applies the said pressure signal to the first of the said faces only.

4. A device as in claim 3, wherein the selector valve has an axially displaceable valve element and an operating solenoid having a movable core connected to the valve element and a coil which is energized during the first part of the travel of the accelerator pedal to keep said valve element in a first axial operative position and which is de-energized during the second part of the travel of the accelerator pedal, the selector valve including resilient biassing means acting on said valve element to effect snap movement of the latter to a second operative position when the solenoid coil is de-energized.

5. A device as in claim 1, wherein the delivery pipe of the pump is connected, between the control valve and the driving pulley, to the selector valve, and including a limiting valve connected to the selector valve and a displacement transducer controlling the limiting valve in dependence upon the position of the movable half-pulley of the driving pulley.

6. A device as in claim 5, wherein the selector valve, in its position in which it intercepts the delivery of the pressure signal from the pressure transducer to the second face of the control valve, places in communication the pump delivery pipe with a chamber of the limiting valve, which chamber is placed by the limiting valve in communication with an exhaust outlet when the distance between the two half-pulleys of the driving pulley falls below a predetermined value.

7. A device as in claim 5 wherein the limiting valve is formed by a cup-shaped sleeve and the modulation valve has a movable element which is coaxial with said sleeve and an elastic element interconnecting said sleeve and said movable element, the bottom of the sleeve being connected to the displacement transducer and acting on the movable element of the modulation valve through said elastic element.

8. A device as in claim 7, including means for adjusting the axial position of the sleeve with respect to the displacement transducer.

* * * * *